Figure 1:
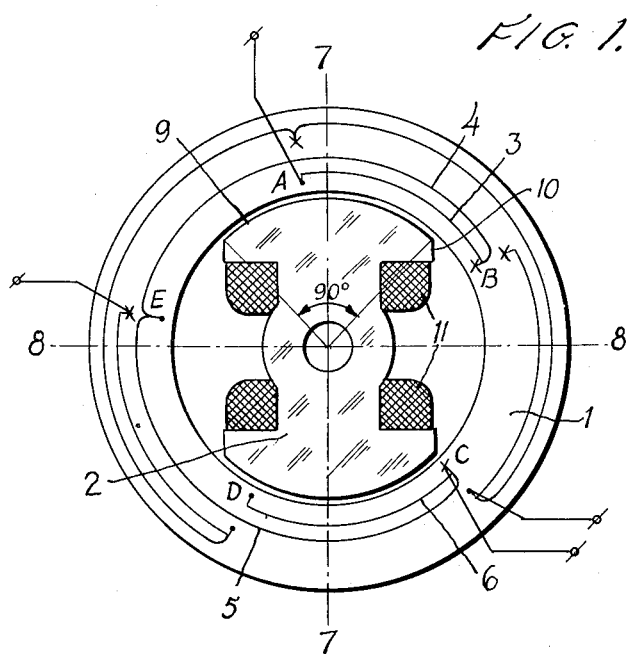

Jan. 17, 1956

S. G. SÖREDAL 2,731,574

DYNAMO ELECTRIC MACHINE FOR
TELEMETERING ANGLE DATA
Filed April 29, 1952

INVENTOR:-
Sven Gunnar Söredal,

BY Pierce, Scheffler & Parker,
ATTORNEYS.

United States Patent Office 2,731,574
Patented Jan. 17, 1956

2,731,574

DYNAMO ELECTRIC MACHINE FOR TELE-METERING ANGLE DATA

Sven Gunnar Söredal, Stockholm, Sweden, assignor to Svenska Ackumulator Aktiebolaget Jungner, Stockholm, Sweden, a corporation of Sweden Application April 29, 1952, Serial No. 284,985

Claims priority, application Sweden May 4, 1951

9 Claims. (Cl. 310—49)

The present invention relates to electric machines comprising a stator and a rotor, one or more pairs of poles and windings which consist of one or more winding phases and are laid down in slots in the stator or/and rotor of the electrical machine, each winding phase consisting of two or more coils per pole.

The invention relates more particularly to such machines used for transforming angle data applied to the rotor of the machine into desired functions of these data (which functions also may be functions of voltages applied to the stator or the rotor of the electric machine) and/or for transducing such data or functions thereof from one place to one or more distant places either directly or via a servo system.

The windings of such machines may consist of winding parts with different mutual mechanical angle displacement, which parts are laid down in slots in the same manner as in multiphase power machines. Each winding part is referred to as a winding phase. In such electrical machines both the stator and the rotor or either of them can be provided with, for instance, one, two or three phases in all combinations.

The winding may further be designed for different pole numbers for instance two, four or six.

The number of slots in the stator or in the rotor may be either odd or even for a two pole machine and the windings per phase are usually distributed in a relatively small number of slots. In cases where high accuracy is required the machines are usually provided with an even number of slots, the winding phases being distributed in all slots. The winding then consists of coil pitch or span the coil with the smallest span being wound around one tooth and the number of turns in the coil being proportional with sine $\alpha$ where $\alpha$ is the angle between each slot and the phase center, i. e. in this case half the angle corresponding to the slot pitch. The next coil then embraces three teeth, namely the first-mentioned tooth and one tooth on each side of the same and so on. The windings for the two poles in each pair of poles are equal. In this system the number of slots must be equal to or a multiple of the product of the pole number and the phase number.

According to the invention an electrical machine comprising a stator and a rotor, one or more pairs of poles and windings which consist of one or more winding phases and are laid down in slots in the stator and/or rotor, each winding phase consisting of two or more coils per pole, is substantially characterized in that the number of slots is odd and that each winding phase includes coils with equal angular span and, if desired, coils with different angular span, the coils with equal angular span having different number of turns.

The advantage obtained with the invention is that a stator or a rotor with such a winding gives substantially the same result as a stator or a rotor with four times as many slots provided with an ordinary winding. In the following it is assumed that the invention is applied to the stator, but of course it may instead be applied to the rotor or to both the rotor and the stator. A special advantage is obtained in such cases where the rotor is provided with salient poles if the poles are formed with cylindrical outer surface concentric with the inner surface of the stator and with the pole edge surfaces milled or grounded to a certain pole width. It has been found that the pole edge surfaces must not necessarily extend radially as seen in a sectional view perpendicular to the axis of the rotor, but they may as well extend in other directions. A satisfactory symmetry of the rotor may be obtained in a simple manner if the pole edge surface is made parallel to the center line of the pole. In certain cases also the rotor must be cylindrical and be provided with slots. In such machines the present invention may be applied both to the stator and to the rotor.

The invention will hereinafter be more fully described with reference to the accompanying drawings. In Fig. 1 of the drawings an electrical machine of the kind referred to is shown, the invention being applied to the stator and the rotor being provided with salient poles. In order to simplify the disclosure, the slots in the stator, as seen in Fig. 1, are designated only by lettered points and only five are involved. However it is understood that the stator will usually be provided with a much larger number of slots as seen better in the perspective presentation in Fig. 2, it being noted also that the slots are skewed and the windings omitted to better show the skewing.

Figure 2:
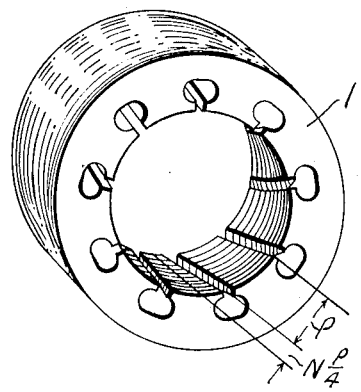

In the drawing 1 designates a laminated stator showing schematically five internal slots A, B, C, D, and E and 2 designates the rotor of the electrical machine. The slots in the stator may advantageously be skewed relatively to the slots or the poles of the rotor, or inversely, over an angle, which is equal to P/4 or a multiple N of P/4, where P is the slot pitch as illustrated in Fig. 2, where the slots in the stator are skewed, the slots or the poles of the rotor then being straight, i. e. the pole edges of the rotor according to Fig. 1 being parallel to the rotor axis. It is easily realized that instead the stator slots may be parallel to the axis and the rotor be skewed over the same angle. The winding is schematically marked by points where the winding current may be said to pass upwards from the plane of the paper and by crosses where the current may be said to pass downwards from the plane of the paper. The ends of the coils are indicated by full lines.

Two winding phases are laid down in the slots the angle displacement between the winding phases being 90°. The slots are indicated by A, B, C, D and E. The first "phase" consists of coils 3, 4, 5 and 6. Coil 3 lies in the slots A and B (around one tooth), coil 4 in slots B and E (around two teeth), coil 5 lies in slots E and C (around two teeth) and coil 6 lies in slots C and D (around one tooth). The center of said first phase is assumed to lie between the slots A, B and C, D respectively, 9° from slot A and 27° from slot D and is indicated by a dot-dash-line 7—7.

The phase center is electrically defined as the direction in which the line of symmetry of the rotor, e. g. of the type shown in the drawing, extending from the rotor axis to the pole center of the poles lies when the voltage induced in the winding phase is a maximum.

It is often advantageous that the number of turns per slot is proportional to sine for the angle between the slot and the phase center. Thus, in the present case the number of turns in coil 3 is proportional to sine 9° and the number of turns is proportional to (sine 63°—sine 9°). In coil 5 the number of turns is proportional to (sine 81°— sine 63°+sine 9°) and in coil 6 the number of turns is proportional to sine 27°. Slot C lies 45° from the phase center (72°—27°=45°). Now, sine 27°+sine 81°—sine 63°+sine 9°=sine 45° and thus, the number of turns in slot C is correct.

The center of the second phase is designated 8—8 and is at right angles to the phase center 7—7. The phase center 8—8 is spaced 9° from slot E and 27° from slot B. The second winding phase consists of four coils similarly arranged and with the same turns as in the first winding phase above described but with respect to the first phase it can be said to have been rotated 90° around the stator axis and turned 180° around the phase center. If the number of phases is odd the number of slots must be a multiple of the number of phases, the phases being equally arranged but distributed around the stator 360°/N from each other, where N is the number of phases.

Inside the stator is a rotor 2 supported in bearings and is concentric with the inner surface of the stator. The rotor is provided with two salient poles, having cylindrical outer surfaces 9, the width of the pole surfaces from edge to edge corresponding to 90° in circumferential direction. The best construction in theoretical respect is obtained when the edge surfaces of the poles extend radially, but in view of the fact that high accuracy in combination with low costs of manufacture is required, it is more practical to work the poles so that the pole edge surfaces extend parallel to the center line of the pole, in which case the required symmetry and the correct width of the pole is easily obtained. The rotor is provided with a winding 11 around each pole. These windings are coupled in series and connected to slip rings or flexible cables.

Though in the embodiment of the invention shown in the drawing the winding phases are provided in the stator they may as well be provided in the rotor for instance as a drum armature winding, the stator in this case being provided with salient poles or windings corresponding to those in the rotor and the terminals of the rotor winding phases being connected to slip rings or flexible cables as well known in the art. Thus, it is to be understood that, since the stator and the rotor represent mutually equivalent elements in electrical respect, any mutual winding relation between the stator and the rotor may be reversed without altering the basic functions of the machine.

The electrical machine according to the invention may be used for instance in a system for transmission of angles (e. g. the angle between the center line of the poles in any angle position of the rotor and the center line of the poles in the rotor position shown in the drawing) or functions thereof from the place where the machine is situated to another place. In this case the electrical machine may be used both as transmitter and receiver in direct angle transmission, and as transmitter in transmission by means of a servo system. In all these cases the rotor winding of the machine shown in the drawing is energized by alternating current. A voltage is then induced in the stator winding which voltage has its maximum value in the first winding phase when the rotor occupies the position shown in the drawing. If the rotor is rotated 90° the voltage induced in this winding phase is zero. It can be shown that if the voltage induced in the winding phase in view is proportional to cosine $v$, where $v$ designates the rotor angle measured from the rotor position shown in the drawing, maximum accuracy in the angle transmission is obtained. This is achieved if the number of turns in each slot is made equal to sine $\alpha$, where $\alpha$ is the angle between the slot and the phase center 7—7.

In order that the effect of the winding according to the drawing shall be readily understood it is assumed at first that neither the stator nor the rotor is skewed. It is further assumed that the width of the rotor poles is 90° and that the center line of the poles coincides with the phase center 7—7 of the first winding phase in the starting position. If the rotor is rotated clockwise from the starting position shown the voltage induced in the first winding phase varies linearly with the angle displacement until the right-hand edge of the upper pole is opposite slot B, which occurs when the rotor has been rotated 63°—45°=18°. From this point the voltage induced in the phase follows another straight line until the left-hand edge of the same pole arrives opposite slot A, which occurs when the rotation corresponds to $$45°-9°=36°$$

from the starting position of the rotor, i. e. after another 18° of rotation. Thereafter the voltage follows another straight line until the left-hand edge of the lowermost pole shown in the drawing arrives at slot E, which occurs after still another 18° of rotation. Thus, points of discontinuity in the curve of the voltage induced in the winding phase occur for every 18° of rotation during a complete revolution of the rotor, which means that the winding has the same effect as an ordinary winding distributed in 360/18=20 slots in the stator, i. e. in four times as many slots as in the stator provided with a winding according to the present invention. The voltage curve with a point of discontinuity for every 18° of rotation coincides very closely with the ideal sine curve. If the stator or the rotor is skewed the voltage curve still closer follows the sine curve, since the short lines between the flexion points in this case will be changed into parabolic arcs.

When the rotor is provided with salient poles it is important to know the optimal pole breadth. In electrical machines with a stator winding according to the invention and with a rotor having salient poles the pole breadth may be equal to $p/4$ or a multiple of $p/4$, where $p$ is the slot pitch. When the invention is applied both to the stator and to the rotor the number of slots should be chosen so that the least common multiple for the number of slots in the stator and the rotor respectively is as great as possible.

In a conventional winding with an even number of slots the winding for each pair of poles is symmetric with respect to the pole center line and further the windings for the two poles are identical. If the rotor has salient poles then at least two pole edges will always be opposite a slot simultaneously. If the pole width is equal to a multiple of the slot pitch all four pole edges will be opposite different slots simultaneously. Changes in the relation between the rotor angle and the voltage induced in the stator will then occur as many times per revolution of the rotor as the number of slots in a two-pole machine or as two times this number. The winding according to the present invention, however, consists of four parts all of which are different from each other, with the result that changes in said relation between the rotor angle and the voltage induced will occur four times the number of slots per revolution in a two-pole machine.

In the embodiment shown in the drawing and described above the electrical machine is a two pole machine with two winding phases in the stator and one winding phase in the rotor. However, the invention may be applied to a machine having any desired number of winding phases and poles, and it is possible to make at least the phase number different in the stator and in the rotor respectively, in order that any desired function of the electrical machine shall be obtained. The winding according to the invention may also be used in power generators and motors for direct or alternating current if a certain function curve of the voltage is desired.

What I claim is:

1. An electric machine with a stator and a rotor for transforming angle data applied to the rotor of the machine into desired functions of these data and/or for transducing such data or functions thereof from one place to one or more distant places either directly or via a servo system, the machine comprising one or more pairs of poles, windings consisting of one or more winding phases and are laid down in slots in the machine, each winding phase consisting of two or more coils per pole, in which machine the number of slots receiving the windings is odd and each winding phase includes coils with both equal and different angular span, at least the coils with equal angular span having different number of winding turns.

2. An electric machine with a stator and a rotor for transforming angle data applied to the rotor of the machine into desired functions of these data and/or for transducing such data or functions thereof from one place to one or more distant places either directly or via a servo system, the machine comprising one or more pairs of poles, windings consisting of one or more winding phases and are laid down in slots in the machine, each winding phase consisting of two or more coils per pole, in which machine the four angles in each winding phase between the phase center for each pole in each pair of poles and the closest adjacent slots being mutually different.

3. An electric machine as claimed in claim 1, in which for each winding phase the number of conductors in each slot is proportional to a desired function of the angle between the slot and the phase center.

4. An electric machine as claimed in claim 1, in which for each winding phase the number of conductors in each slot is proportional to sine $\alpha$, where $\alpha$ is the electrical angle between the slot and the phase center.

5. An electric machine with a stator and a rotor for transforming angle data applied to the rotor of the machine into desired functions of these data and/or for transducing such data or functions thereof from one place to one or more distant places either directly or via a servo system, the machine comprising one or more pairs of poles, windings consisting of one or more winding phases and are laid down in slots in the machine, each winding phase consisting of two or more coils per pole, in which machine the number of slots receiving the windings is odd and each winding phase includes coils with both equal and different angular span, at least the coils with equal angular span having different number of winding turns, and, counted from the coil with the smallest coil span in each winding phase and for each pole, the coil span of each following coil belonging to the same winding phase and pole being increased by one slot pitch with respect to the next preceding coil.

6. An electric machine as claimed in claim 1, in which the winding phases are provided in the stator, the rotor being provided with salient poles with cylindrical pole surface.

7. An electric machine as claimed in claim 1, in which winding phases are provided in the stator, and the rotor is provided with salient poles, the pole edge surfaces of which being parallel to the symmetry line of the pole.

8. An electric machine as claimed in claim 1, the slots in the stator being skewed relatively to the slots or the poles of the rotor, or inversely, over an angle, which is equal to $p/4$ or a multiple of $p/4$, where $p$ is the slot pitch.

9. An electric machine as claimed in claim 1, in which the winding phases are provided in the stator, the rotor being provided with skewed poles, the breadth of which being equal to $p/4$ or a multiple of $p/4$, where $p$ is the slot pitch.

References Cited in the file of this patent

UNITED STATES PATENTS

| | | |
|---|---|---|
| 2,393,527 | Fuge | Jan. 22, 1946 |
| 2,535,914 | Glass | Dec. 26, 1950 |
| 2,550,663 | Bechberger et al. | May 1, 1951 |